United States Patent
Heger et al.

[11] Patent Number: 5,917,314
[45] Date of Patent: Jun. 29, 1999

[54] ELECTRONIC WALL-STUD SENSOR WITH THREE CAPACITIVE ELEMENTS

[75] Inventors: Charles E. Heger, Saratoga; Paul W. Dodd, San Jose, both of Calif.

[73] Assignee: Zircon Corporation, Campbell, Calif.

[21] Appl. No.: 08/694,955

[22] Filed: Aug. 8, 1996

[51] Int. Cl.[6] .............................. G01R 19/00; G01R 27/26
[52] U.S. Cl. .............................................. 324/67; 324/672
[58] Field of Search .............................. 324/67, 326, 658, 324/663, 672, 679, 686

[56] References Cited

U.S. PATENT DOCUMENTS

| | | | |
|---|---|---|---|
| 3,278,843 | 10/1966 | Deming | 324/61 |
| 3,662,258 | 5/1972 | Murphy et al. | 124/41 |
| 3,704,413 | 11/1972 | Blevins | 324/67 |
| 3,836,848 | 9/1974 | Blevins | 324/67 |
| 4,041,382 | 8/1977 | Washburn | 324/65 R |
| 4,067,225 | 1/1978 | Dorman et al. | 73/1 DV |
| 4,086,528 | 4/1978 | Walton | 324/61 R |
| 4,099,118 | 7/1978 | Franklin et al. | 324/61 |
| 4,130,796 | 12/1978 | Shum | 324/61 R |
| 4,322,678 | 3/1982 | Capots et al. | 324/61 R |
| 4,464,622 | 8/1984 | Franklin | 324/67 |
| 4,639,666 | 1/1987 | Strosser et al. | 324/202 |
| 4,676,100 | 6/1987 | Eichberger | 73/304 |
| 4,752,727 | 6/1988 | Schneider | 324/672 |
| 4,847,552 | 7/1989 | Howard | 324/67 |
| 4,853,617 | 8/1989 | Douglas et al. | 324/67 |
| 4,868,910 | 9/1989 | Maulding | 324/233 |
| 4,939,455 | 7/1990 | Tsugawa | 324/168 |
| 4,947,116 | 8/1990 | Welcome et al. | 324/173 |
| 4,992,741 | 2/1991 | Douglas et al. | 324/671 |
| 5,023,484 | 6/1991 | Pathak et al. | 307/465 |
| 5,352,974 | 10/1994 | Heger | 324/67 |

*Primary Examiner*—Walter E. Snow
*Attorney, Agent, or Firm*—Skjerven, Morrill, MacPherson Franklin & Friel, LLP; Norman R. Klivans

[57] ABSTRACT

A device for locating the edges of wall studs includes a comparison circuit connected to each of three capacitive elements. As the device is moved along a wall, the comparison circuit monitors the relative charge time associated with each capacitive element, the charge times providing an indication of the relative capacitances of the three capacitive elements. Changes in the relative capacitances of the three elements as the device is moved along a wall are due to a change in the dielectric constant of the wall, which normally results from the presence of a wall stud behind the surface over which the device is moved. The comparison circuit uses differences in the measured relative capacitances of the first, second, and third capacitive elements to locate the edges of the stud.

11 Claims, 12 Drawing Sheets

5,917,314

ELECTRONIC WALL-STUD SENSOR WITH THREE CAPACITIVE ELEMENTS

BACKGROUND

This invention relates to sensors suitable for locating objects positioned behind or within a volume of material, and in particular to a wall-stud sensor.

U.S. Pat. No. 4,464,622, issued Aug. 7, 1984, discloses an electronic sensor for locating objects, such as wall studs, positioned behind wall surfaces. That sensor detects the edges of studs by measuring changes in the capacitance of a wall due to the presence or absence of a stud as the sensor is moved along the wall surface.

That sensor includes capacitive plates, or elements, connected to circuits that detect changes in the capacitance of those elements. As the sensor is moved along a wall, any such capacitive changes are presumably due to changes in the dielectric constant of the wall; increased capacitance is generally associated with the presence of a wall stud.

While this sensor works well to locate the edges of studs within most walls, experience has shown that its performance could be improved in several respects. For example, the precision with which that sensor locates a given stud edge depends upon various extraneous factors that affect wall capacitance, such as the thickness of the wall covering material, the dielectric constant of the wall covering material and the stud, the ambient humidity, and the temperature of the electronics within the sensor. Variances in some of these factors are compensated for by calibrating the sensor prior to each use by placing the sensor against the wall covering material at a place behind which there is presumed to be no stud. However, such calibration does not completely compensate for such variances. For example, changes in the thickness of wall covering thickness change the perceived location of stud edges. Furthermore, the calibration may be erroneous if there is a stud adjacent or partially adjacent the sensor during calibration. Accordingly, there is a need for a sensor that is easier to calibrate and less sensitive to variations in extraneous parameters that affect wall capacitance, particularly various wall thicknesses.

SUMMARY

The present invention is directed to an easily calibrated sensor that is relatively insensitive to variations in extraneous factors that affect wall capacitance. The sensor includes a comparison circuit connected to each of three capacitive elements. As the sensor is moved along a wall, the comparison circuit monitors the relative charge time of three capacitive elements, the charge times providing an indication of the relative capacitances of the three capacitive elements. As the sensor is moved along a wall, changes in the relative capacitances of the three elements will occur in the presence of a hidden stud as a result of changes in the dielectric constant of the wall. The comparison circuit uses differences in the measured relative capacitances of the first, second, and third capacitive elements to locate the stud. Finally, the sensor includes an intuitive "window" display that simplifies the task of locating a stud by providing a user with an image of the hidden stud as the sensor is moved over the stud.

This summary does not purport to define the invention. The invention is defined by the claims.

DETAILED DESCRIPTION

Figure 1:
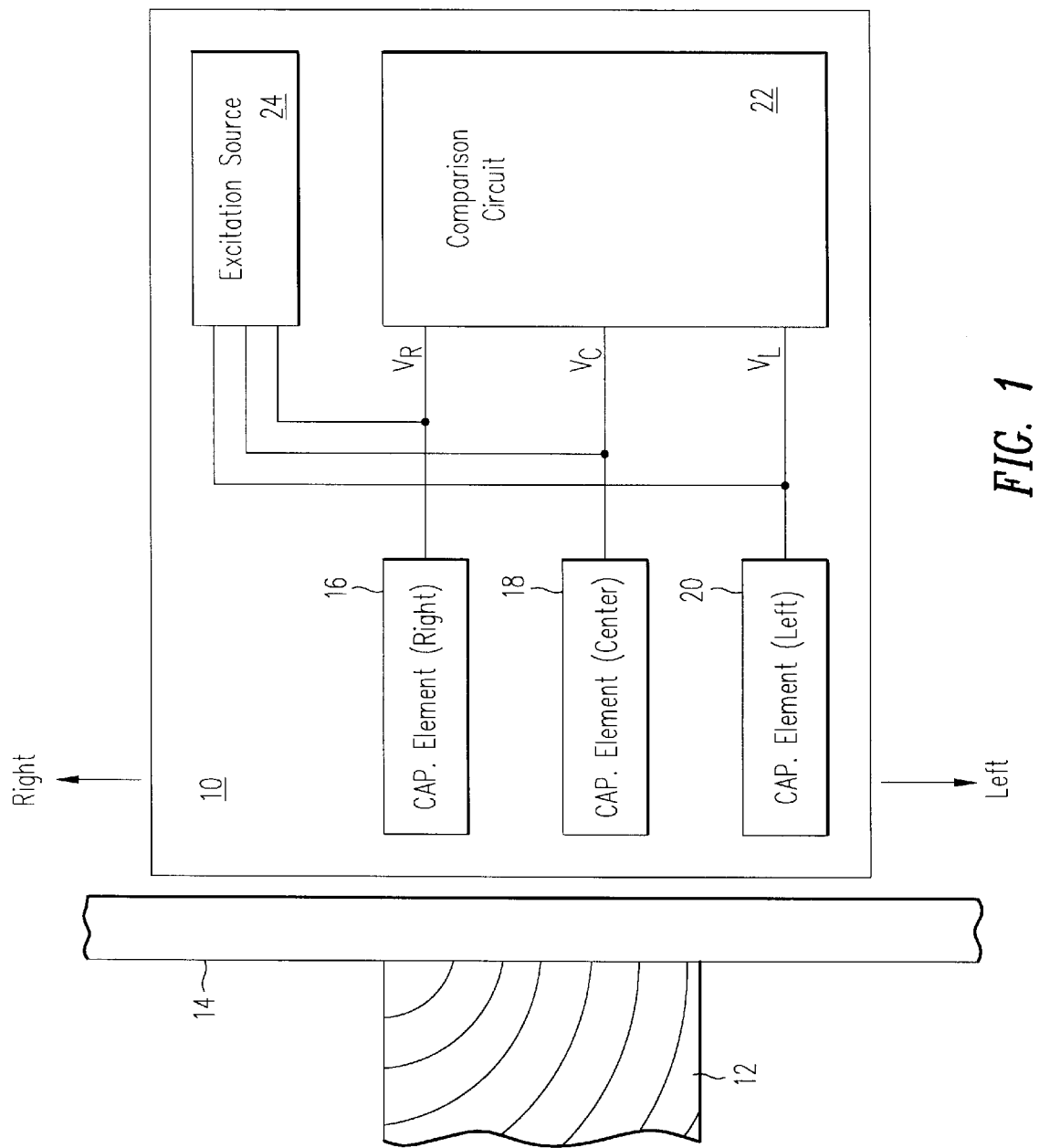
FIG. 1 is a block diagram of a sensor 10 that may be used to locate a stud 12 behind a wall covering 14.

FIG. 1 is a block diagram of a sensor 10 that may be used to locate a stud 12 behind a wall covering 14. To locate stud 12, sensor 10 is moved along wall covering 14 until sensor 10 provides an indication of wall stud 12.

Sensor 10 includes right, center, and left capacitive elements 16, 18, and 20, respectively. Capacitive elements 16, 18, and 20 are connected via respective lines $VR_I$, $V_C$ and $V_L$ to a comparison circuit 22 and an excitation source 24. In operation, excitation source 24 provides electrical charge to each of elements 16, 18, and 20, enabling comparison circuit 22 to compare the relative capacitive values of capacitive elements 16, 18, and 20. In accordance with the present invention, the relative capacitive values are used to determine the location and placement of stud 12 behind wall covering 14.

Figure 2:
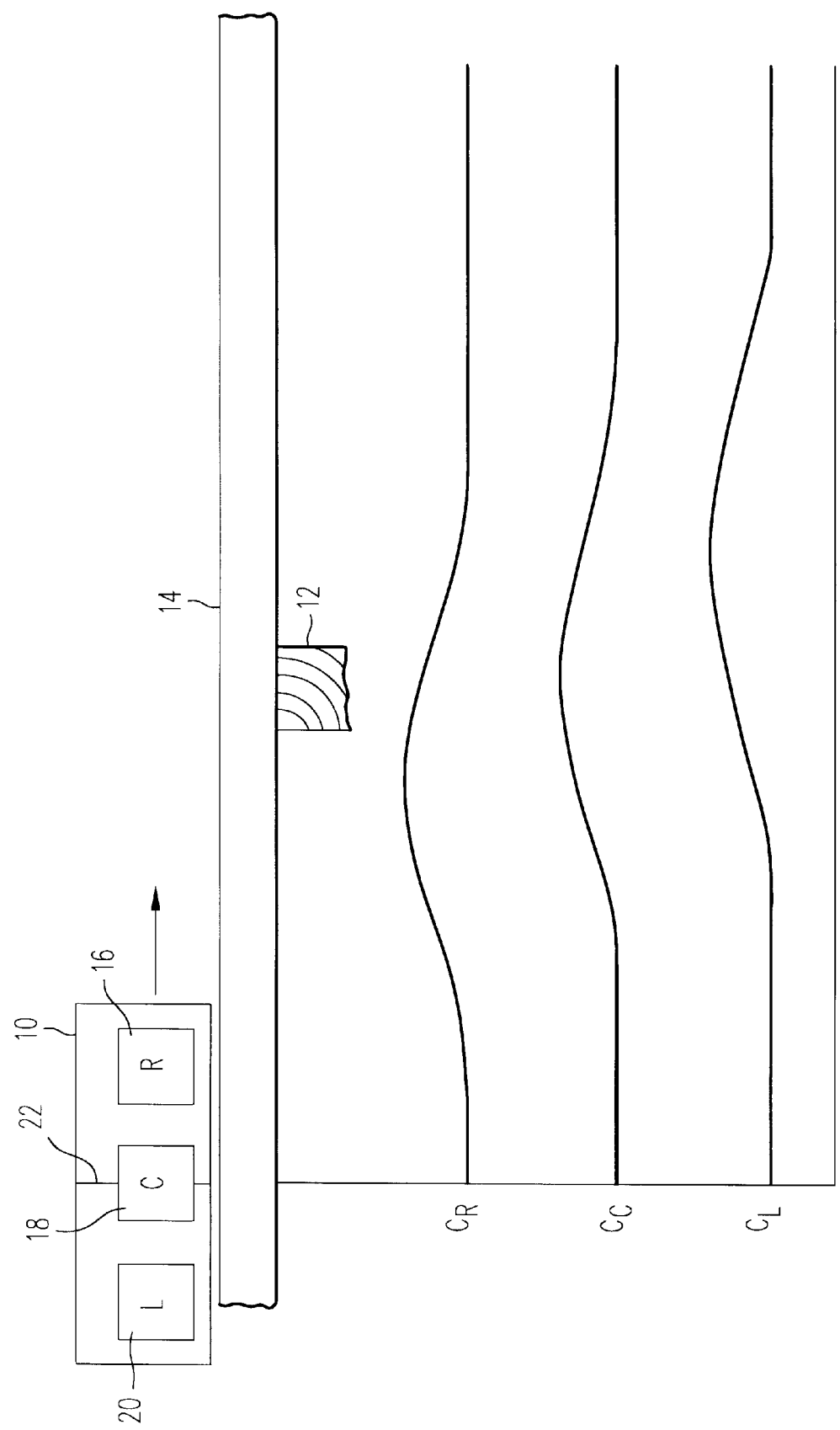
FIG. 2 is a graph of capacitance (vertical axis) versus position (horizontal axis) for the capacitance values $C_R$, $C_C$ and $C_L$ corresponding to the right capacitive element 16, the center capacitive element 18, and the left capacitive element 20, respectively.

It is known in the art that the presence of a dielectric increase capacitance by a factor k, so that the capacitance C of a capacitive element in the presence of a dielectric is expressed as:

$$C = kC_O \qquad [1]$$

where $C_O$ is the capacitance of the element in the absence of a dielectric (e.g., adjacent a vacuum). FIG. 2 is a graph of capacitance (vertical axis) versus position (horizontal axis) for the capacitance values $C_R$, $C_C$ and $C_L$ corresponding to the right capacitive element 16, the center capacitive element 18, and the left capacitive element 20, respectively. The arrow of FIG. 2 indicates that in use stud sensor 10 is moved by the user left to right over wall covering 14. The capacitive levels shown are taken with respect to a center line 22 of stud sensor 10. As stud sensor 10 is moved left to right, capacitive element 16 first encounters stud 12. Because stud 12 acts as a dielectric, capacitive value $C_R$ of capacitive element 16 increases as sensor 10 approaches stud 12, the maximum value of the capacitance $C_R$ occurring when capacitive element 16 is directly over stud 12. Subsequent to capacitive element 16 passing over stud 12, capacitive element 18 and, in turn, capacitive element 20 similarly pass over stud 12. Consequently, as shown in FIG. 2, the rise and fall of the capacitance values $C_R$, $C_C$ and $C_L$ occur at different positions. As explained below, sensor 10 uses the relative magnitudes of capacitances $C_R$, $C_C$, and $C_L$ as sensor 10 is moved over stud 12 to determine the placement of stud 12.

Figure 3A:
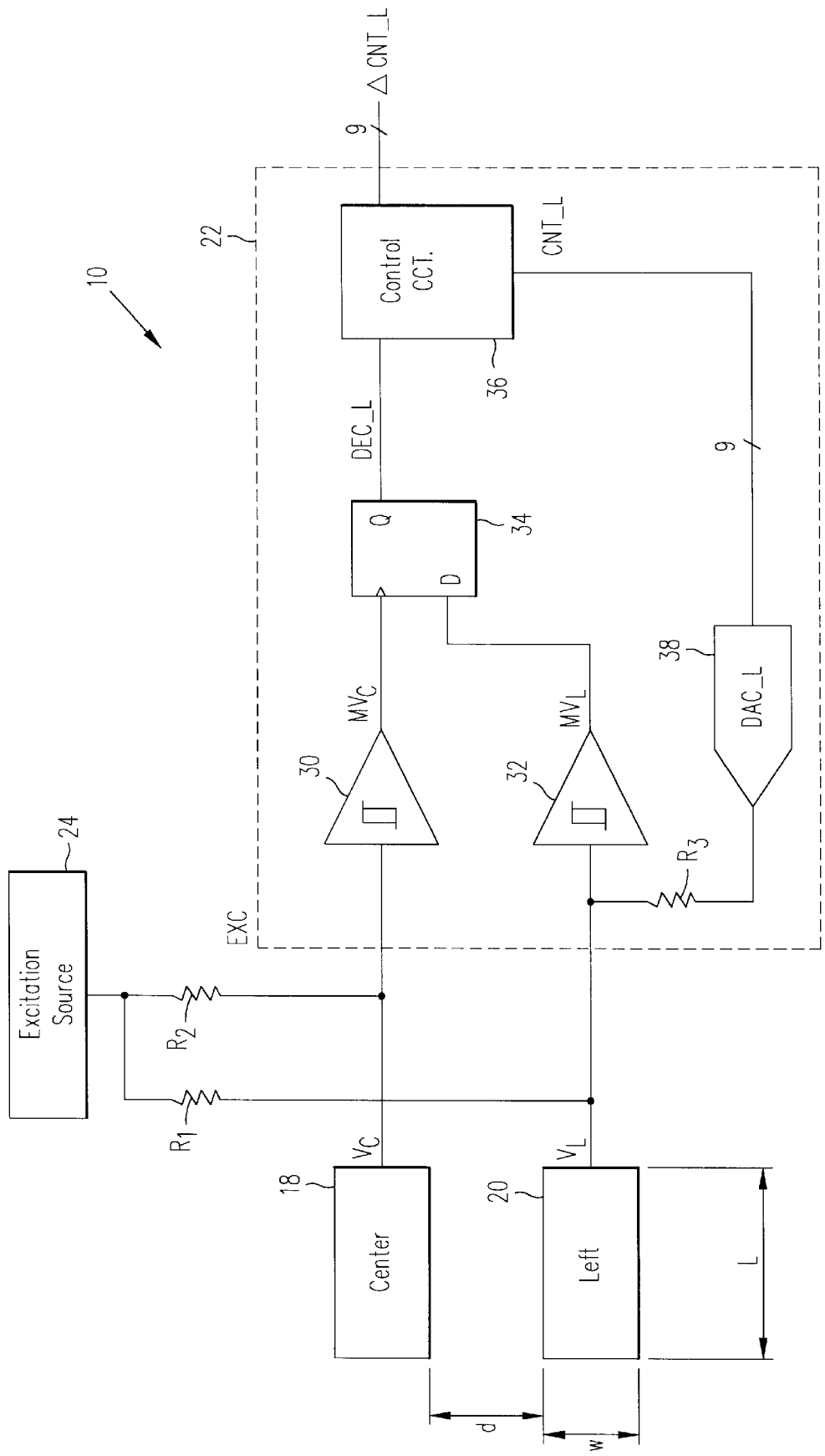
FIG. 3A is a block diagram of a portion of sensor 10, and in conjunction with FIG. 3B illustrates how the relative capacitance $C_C$ of capacitive element 18 is compared to capacitance $C_L$ of capacitive element 20 in accordance with one embodiment of the present invention.
Figure 3B:
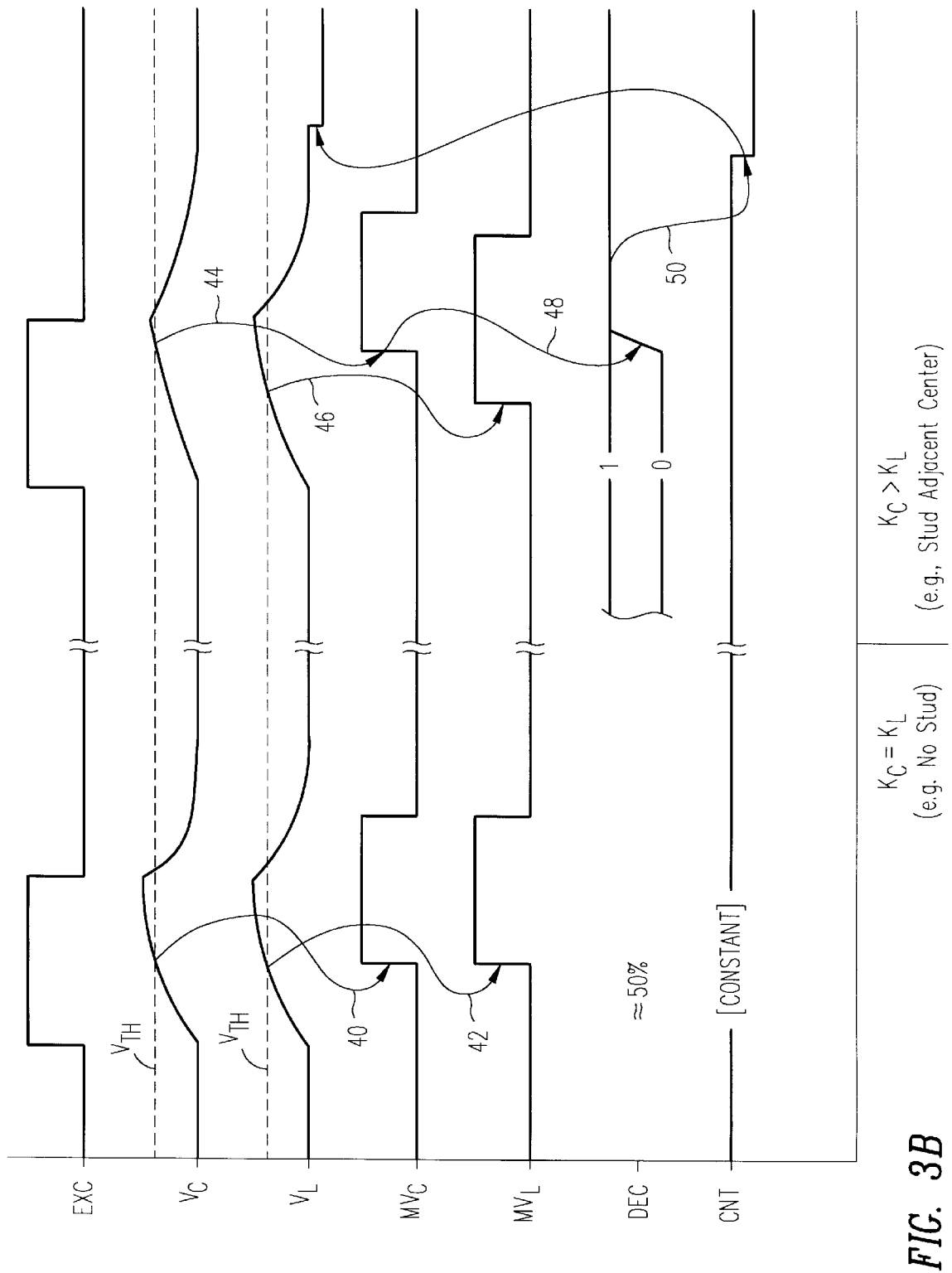
FIG. 3B illustrates the operation of sensor 10.

FIG. 3A is a block diagram of a portion of sensor 10, and in conjunction with FIG. 3B illustrates how the relative capacitance $C_C$ of capacitive element 18 is compared to capacitance $C_L$ of capacitive element 20 in accordance with one embodiment of the present invention. As shown in FIG. 3A, excitation source 24 includes an output terminal EXC that is connected to line $V_L$ via a resistor R1 and to line $V_C$ via a resistor R2. Comparison circuit 22 includes a pair of Schmitt triggers 30 and 32. Schmitt trigger 30 is connected via a line $MV_C$ to the clock terminal of a D flip-flop 34. Schmitt trigger 32 is connected via a line $MV_L$ to the D-input of flip-flop 34.

The output terminal Q of flip-flop 34 is connected to a control circuit 36 via a line DEC_L (for decrement left DAC). Control circuit 36 includes a first nine-line bus CNT_L coupled to the input terminals of a digital-to-analog converter (DAC) 38 and a second nine-line bus ΔCNT_L. DAC 38 has an output terminal connected to line $V_L$ via a resistor R3.

Note that DAC 38 is designated DAC_L, the first nine-line bus CNT_L, and the second nine-line bus ΔCNT_L. The common "_L" indicates that these components are associated with Left capacitive element 16. This labelling convention is used herein when referring to other components associated with the right (_R), center (_C), and left (_L) capacitive elements 16, 18, and 20, respectively.

FIG. 3B is a timing diagram illustrating the operation of sensor 10 in two circumstances. In the first, depicted in the left side of FIG. 3B, the dielectric constants $k_c$ and $k_l$ of the materials adjacent elements 18 and 20, respectively, are equal (e.g., when there is no stud adjacent either of elements 18 or 20). In the second circumstance, depicted in the right side of FIG. 3B, the dielectric constant $k_c$ of center element 18 is greater than the dielectric constant $k_l$ of left element 20 (e.g., when stud 12 is adjacent center element 18 only).

Excitation source 24 outputs a periodic binary signal on line EXC that switches from a logic 0 (e.g., zero volts, or ground potential) to a logic 1 (e.g., five volts). In one embodiment, the signal on line EXC is a 16 KHz signal having a duty cycle of 1/16.

Each time the signal on line EXC goes high, the voltage levels on lines $V_C$ and $V_L$ increase at a rate determined by the resistances of resistors R1 and R2 and the capacitances $C_C$ and $C_L$ of elements 18 and 20, respectively. In the embodiment of FIG. 3A, resistors R1 and R2 are equal, as are the areas of capacitive elements 18 and 20. Consequently, the voltage levels on lines $V_C$ and $V_L$ increase at the same rate in the absence of any difference between dielectric constants $k_c$ and $k_l$. In one embodiment, resistors R1 and R2 (and a similar resistor, not shown, corresponding to capacitive element 16) are each 220 KΩ, and each of capacitive elements 16, 18, and 20 have a length L of two inches, a width W of 0.66 inches, and are spaced apart a distance d of 0.01 inches.

As capacitive elements 18 and 20 charge, the respective voltages on lines $V_C$ and $V_L$ increase. Then, when the voltages on lines $V_C$ and $V_L$ exceed the threshold voltage $V_{th}$ of Schmitt triggers 30 and 32, respectively, Schmitt triggers 30 and 32 output a logic one on their respective output lines $MV_C$ and $MV_L$. Because dielectric constants $k_c$ and $k_l$ are equal, the outputs of Schmitt triggers 30 and 32 should go to logic one at virtually the same instant in time, as indicated by arrows 40 and 42.

Flip-flop 34 is a conventional positive-edge-triggered flip-flop 34. Thus, if the logic level on the D input (line $MV_L$) is a logic one on the rising edge of clock terminal (line $MV_C$), then output terminal Q of flip-flop 34 will go to a logic one. If, on the other hand, the input signal on the D input is a logic zero on the rising edge of the signal on line $MV_C$, then output terminal Q will output a logic zero.

Because the signals on lines $MV_C$ and $MV_L$ are approximately coincident in the foregoing example, the output level on terminal Q of flip-flop 34 will be either a logic one or a logic zero. Further, over the course of many excitation cycles on line EXC, the output level on terminal Q of flip-flop 34 will be a logic one approximately 50% of the time.

Control circuit 36 averages the signal on line DEC_L over a number of excitation pulses (e.g., 64 cycles in one embodiment) to reduce the effects of noise. In the case described above in which the average count on line DEC is 0.5, control 36 maintains a relatively constant output count on bus CNT_L. Consequently, the resting (i.e., unexcited) voltage level on line $V_L$ is approximately constant. In one embodiment, if the number of logic ones counted over 64 cycles is less than or equal to 28, than the average count is set to a logic zero; if the number of logic ones is greater than 28 and less than 36, the average count is left unchanged from the last cycle; and if the number of logic ones is greater than or equal to 36, than the average count is set to a logic one.

So long as dielectric constants $k_c$ and $k_l$ remain equal, so too will capacitances $C_C$ and $C_L$ of respective elements 18 and 20. Furthermore, comparison circuit 22 will remain balanced as discussed above so that the count on bus CNT_L will remain approximately constant. The count required to maintain coincident rising edges for the signals on lines $MV_C$ and $MV_L$ is stored in control circuit 36 as a calibration count CAL_L.

FIG. 3B depicts the circumstance in which the dielectric constant $k_c$ of center element 18 is greater than the dielectric constant $k_l$ of left element 20 (e.g., when stud 12 is adjacent center element 18). Because stud 12 increases the dielectric constant $k_c$ adjacent capacitive element 18, the capacitance $C_C$ of element 18 increases. As a result, the time required to charge capacitive element 18 to a level sufficient to raise the voltage on line $V_C$ above threshold voltage $V_{th}$ of Schmitt trigger 30 increases.

The increased charge time of capacitance $C_C$ delays the time at which Schmitt trigger 30 is triggered (identified by arrow 44) to a time later than the time at which Schmitt trigger 32 is triggered (identified by arrow 46). Further, because the voltage on line MVc, which clocks flip-flop 34, transitions while the signal on line $MV_L$ is a logic one, the output signal on line DEC_L will necessarily be a logic one, as indicated by arrow 48.

The line DEC_L is so-called because a logic one on line DEC_L instructs control circuit 36 to decrement the count on bus CNT_L. By so doing, the output level of DAC 38 (and therefore the voltage on line $V_L$) is decreased, as indicated by arrow 50. By decreasing the voltage on line $V_L$, the time required to ramp the voltage on line $V_L$ up to the threshold voltage $V_{th}$ of Schmitt trigger 32 increases. Consequently, the next time excitation source 24 outputs a logic one on line EXC the signal on line $MV_L$ will transition to a logic one at a time closer to the transition on line $MV_C$.

This feedback will continue over a number of excitation-source cycles until the transitions on lines $MV_C$ and $MV_L$ are nearly coincident.

If stud 12 were located adjacent the left capacitive element 20, the output voltage on line $V_L$ would require a longer time period to reach the threshold voltage Vth then would the voltage on line $V_C$. Consequently, the rising edge of the signal on line $MV_C$ would occur before a logic one was present on the D terminal of flip-flop 34, and the output signal on line DEC_L would be a logic zero. A logic zero on line DEC_L causes control circuit 36 to increase the count on line CNT_L, thereby increasing the voltage level on line $V_L$. An increased base voltage on line $V_L$ causes the signal on line $V_L$ to reach the threshold voltage $V_{th}$ sooner than in the previous cycle. This feedback cycle continues until the voltage on lines $V_L$ and $V_C$ simultaneously reach the threshold voltage $V_{th}$. In one embodiment, the count on bus CNT_L required to provide coincidence between the transitions on lines $MV_C$ and $MV_L$ is established quickly using a conventional successive approximation routine.

The above-described feedback continuously operates to maintain coincident rising edges for the signals on lines $MV_C$ and $MV_L$. This condition may be referred to as "equilibrium." To maintain circuit 22 in equilibrium, the count supplied to DAC 38 on bus CNT_L must change to compensate for any change in the relative capacitances $C_C$ and $C_L$ of capacitive elements 18 and 20. Thus, the count on line CNT_L provides an indication of the relative capacitances $C_C$ and $C_L$ of capacitive elements 18 and 20. In particular, the calibration count CAL_L required to balance circuit 22 when capacitances $C_C$ and $C_L$ are equal is subtracted from the count on bus CNT_L required to balance circuit 22 when capacitances $C_C$ and $C_L$ are not equal. The resulting difference between the left calibration count CAL_L and the count on bus CNT_L is expressed digitally on bus ΔCNT_L (i.e., ΔCNT_L=CNT_L−CAL_L). For example, if the calibration count CAL_L were 56 and a difference in dielectric constants $k_l$ and $k_c$ required 100 DAC steps on bus CNT_L to compensate for the difference, the binary data present on bus ΔCNT_L would represent 100−56=44 DAC steps.

The circuit of FIG. 3A compares the relative capacitances $C_C$ and $C_L$ of capacitive elements 18 and 20 to maintain the left and center capacitive elements 20 and 18 in equilibrium. Other circuitry within comparison circuit 22 compares the respective capacitances $C_R$ and $C_C$ of right capacitive element 16 and center capacitive element 18 to similarly maintain the right and center capacitive elements 16 and 18 in equilibrium. Because each of right and left elements 16 and 20 are in equilibrium with center element 18, right and left elements 16 and 20 are also in equilibrium with respect to one another. This aspect of the invention is described in more detail with reference to FIG. 5.

Figure 4:
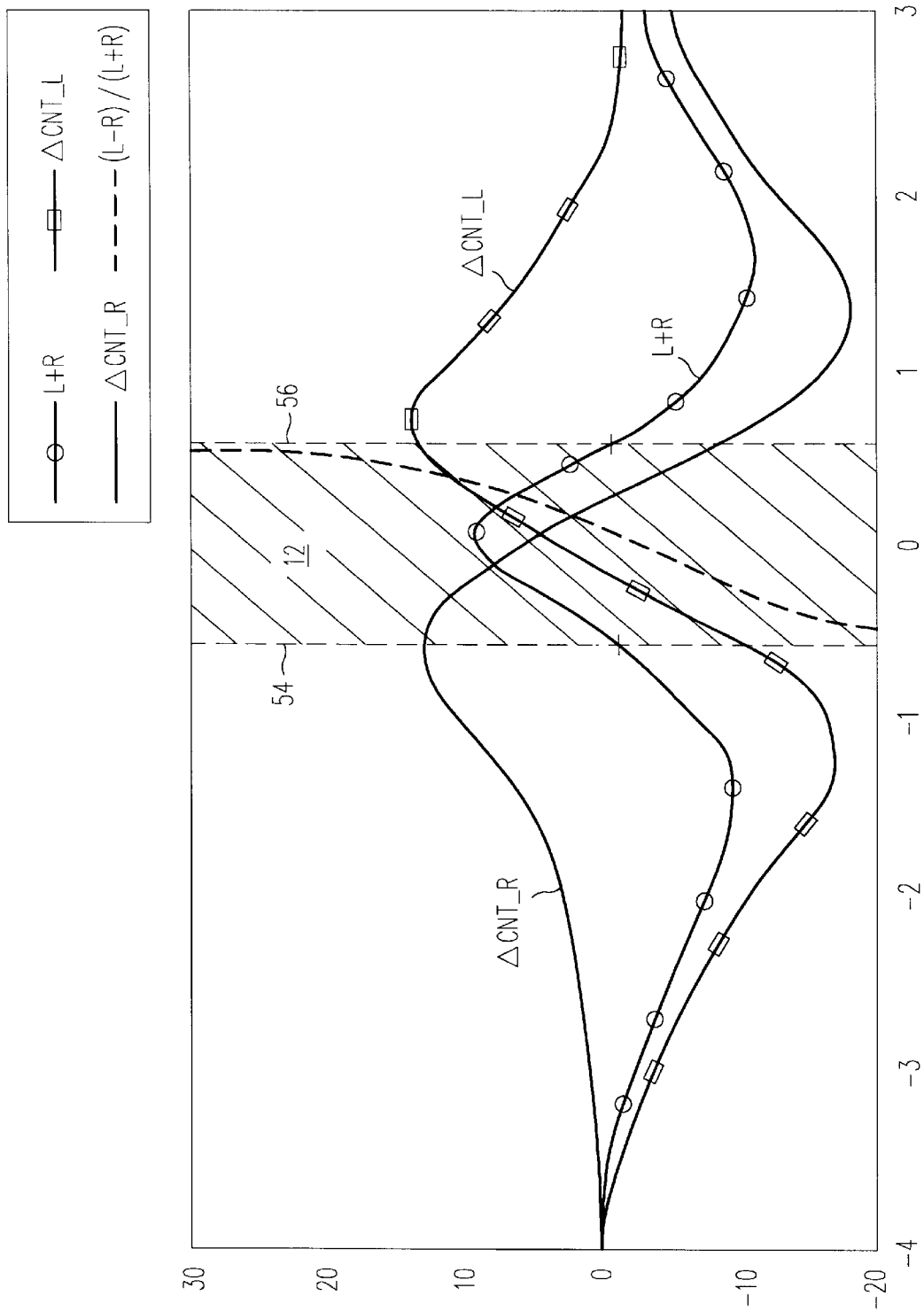
FIG. 4 graphically represents the number of DAC steps (vertical axis) required to maintain equilibrium between capacitive elements 16, 18, and 20 of FIG. 1.

FIG. 4 graphically represents the number of DAC steps (vertical axis) required to maintain equilibrium between capacitive elements 16, 18, and 20 of FIG. 1 as sensor 10 is moved from 4 inches to the left of stud 12 (i.e., −4) to 3 inches to the right of stud 12 (i.e., 3). The line ΔCNT_R indicates the number of DAC steps required to maintain right capacitive element 16 in equilibrium with center capacitive element 18, while the line ΔCNT_L represents the amount of DAC steps required to maintain equilibrium between center capacitive element 18 and left capacitive element 20.

Beginning at -4, representative of when the center of stud sensor 10 is located 4 inches to the left of stud 12, each of lines ΔCNT_R and ΔCNT_L shows that the right and left capacitive elements 16 and 20 require zero DAC steps to achieve equilibrium. The zero DAC steps of the vertical axis in FIG. 4 is not an absolute value of zero. Instead, DAC 38 (and a similar DAC for right capacitive element 16) has provided the non-zero calibration count CAL_L on bus CNT during a calibration step: the DAC steps of FIG. 4 represent the number of steps above and below the respective calibration points for the right and left elements 16 and 20.

Referring to line ΔCNT_R, FIG. 4 shows that as the right capacitive element 16 approaches stud 12 the number of DAC steps required to maintain equilibrium increases. This requisite increase is due to the increased capacitance $C_R$ of capacitive element 16. At the same time, because capacitive element 18 (the center element) is also approaching stud 12, line ΔCNT_L shows that DAC 38 associated with left capacitive element 20 is decreasing. This decrease is not due to a decrease in the capacitance $C_L$ of left capacitive element 20, but is instead due primarily to an increase in capacitance $C_C$ of capacitive element 18.

Also shown in FIG. 4 is a line L+R (short for ΔCNT_R+ΔCNT_L) representing the sum of the DAC steps for the left and right capacitive elements 20 and 16, respectively. Interestingly, when the center capacitive element 18 is centered about an edge 54 of stud 12, ΔCNT_R and ΔCNT_L are equal in magnitude and opposite in polarity; consequently, the sum L+R is equal to zero when the center of sensor 10 is located above edge 54. The sum L+R is similarly equal to zero when the center of sensor 10 is located directly over edge 56.

A fourth line of FIG. 4 depicts the ratio (L−R)/(L+R). Because the denominator L+R is equal to zero at each of edges 54 and 56 where L+R equals zero of stud 12, the ratio (L−R)/(L+R) is infinite at edges 54 and 56 where L+R equals zero. It has been found that this ratio is useful in identifying the presence of stud edges. Using the ratio (L−R)/(L+R) is advantageous because the ratio cancels out some dielectric variations. For example, changes in humidity or wall covering material can affect the left, center, and right capacitances $C_L$, $C_C$, and $C_R$ and will therefore affect the values of L and R; however, such changes will not affect the ratio (L−R)/(L+R). Consequently, sensor 10 may be calibrated whenever the dielectric constants $k_r$, $k_c$, and $k_l$ of the respective right, center, and left capacitive elements 16, 18, and 20 are equal, such as in air. This is preferable to prior art sensors that must be calibrated against each wall over which the sensor is scanned to compensate for variations in wall capacitance.

Figure 5:
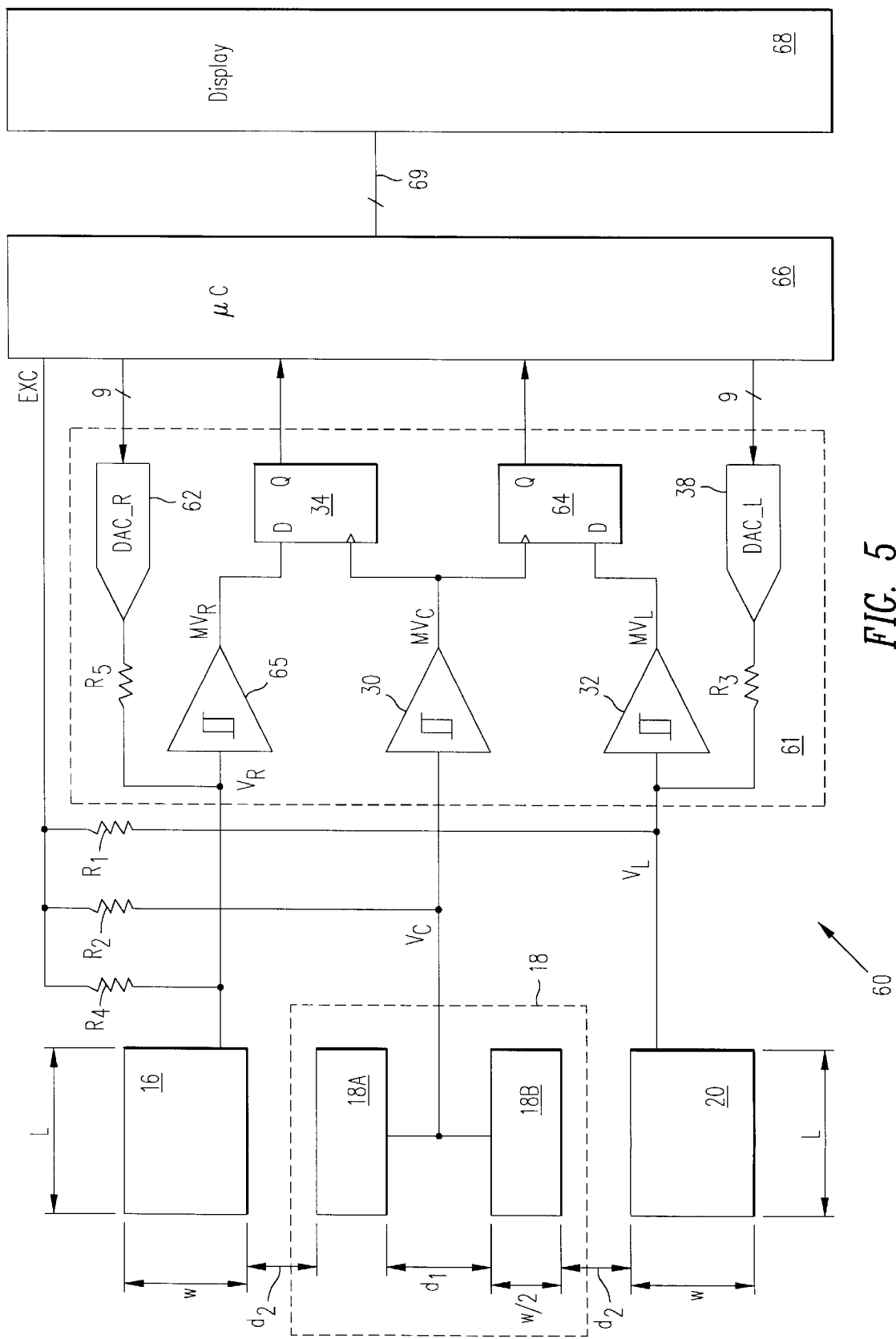
FIG. 5 is a schematic diagram of an embodiment of a sensor 60 in which center capacitive element 18 is divided into a pair of capacitive elements 18a and 18b.

FIG. 5 is a schematic diagram of an embodiment of a sensor 60 in which center capacitive element 18 is divided into a pair of capacitive elements 18a and 18b. Sensor 60 is generally similar to sensor 10 of FIGS. 1 and 3a, like-numbered elements being the same. However, in the embodiment of FIG. 5, capacitive elements 16, 18, and 20 have dimensions different from the like elements of FIGS. 1 and 3A.

Sensor 60 includes a comparator circuit 61, which includes, in addition to the elements of comparator circuit 22 of FIG. 3A, a second DAC 62, a second flip-flop 64, a resistor R4 connected between line EXC and line $V_R$, and a resistor R5 connected between the output of DAC 62 and line $V_R$. Comparison circuit 61 also includes an additional Schmitt trigger 65 that is substantially identical to Schmitt triggers 30 and 32. A display 68 provides a visual indication of the location of stud 12 based on data supplied from a microcontroller 66 via a bus 69.

Microcontroller 66 functions as both a controller circuit for adjusting the output voltage levels of DAC 62 and DAC 38 and an excitation source for providing the periodic excitation signal on line EXC to capacitive elements 16, 18, and 20. Comparison circuit 61 works in conjunction with microcontroller 66 substantially as described above in connection with FIGS. 3A and FIGS. 3B to maintain equilibrium between capacitive elements 16, 18, and 20.

In one embodiment, microcontroller 66 is a 16C73 microcontroller available from Microchip Corporation of Chandler, Arizona. Using a 16C73 microcontroller allows DAC 62 and DAC 38 to be implemented as part of microcontroller 66. In that embodiment, DAC 62 and DAC 64 conventionally convert digital DAC steps into analog voltage levels by outputting an averaged pulse-width modulated signal as the analog voltage. Micro-controller 66 is programmed to use machine-code cycle counting, rather than conventional interrupt control, to minimize jitter between the clock signal on line $C_L$ K and the outputs of DAC 62 and DAC 64.

It is to be understood that one of ordinary skill in the art could code the microcontroller computer program in light of the detailed operating steps described hereinafter.

Figure 6:
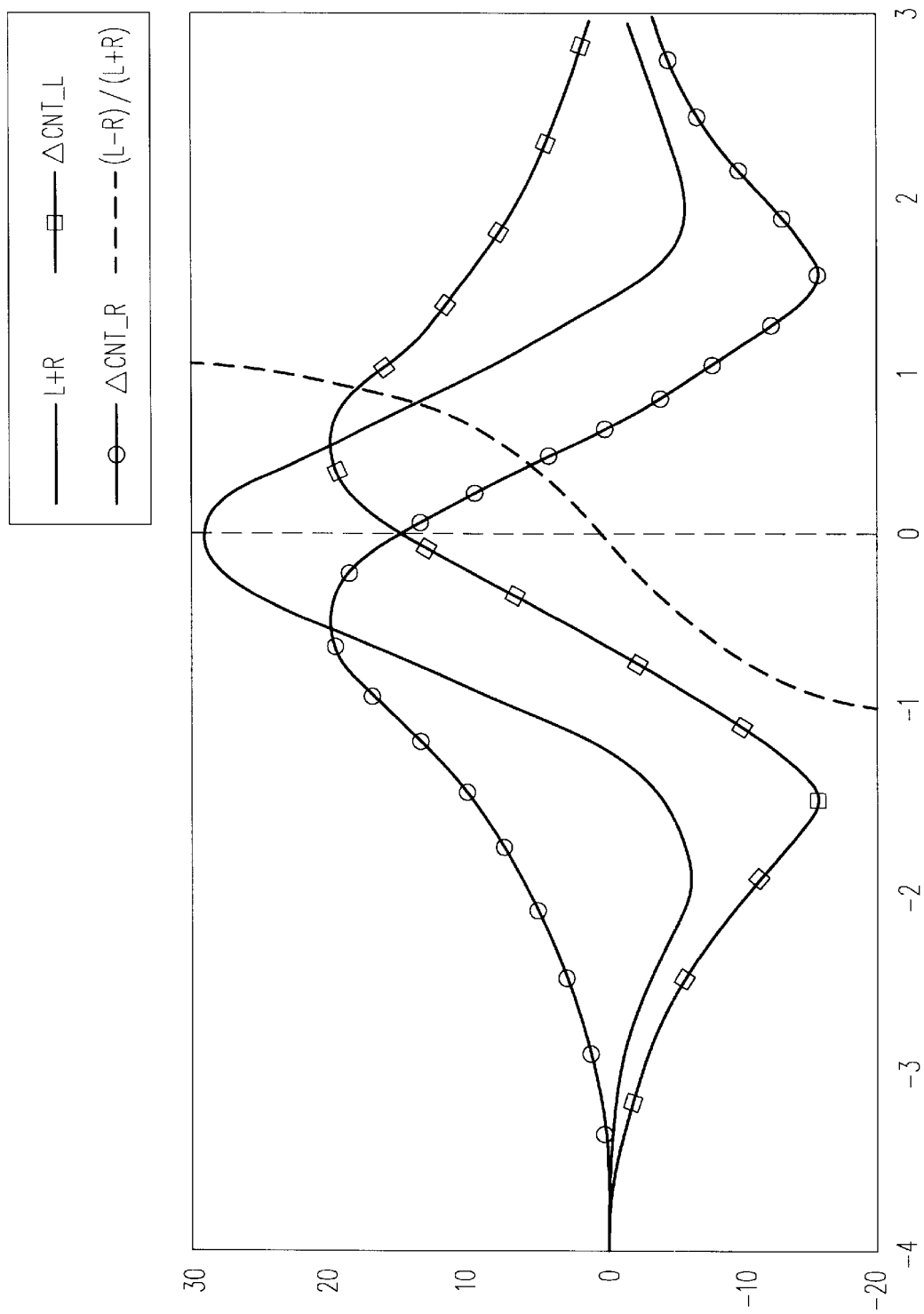
FIG. 6 graphically represents the number of DAC steps (vertical axis) required to maintain equilibrium between capacitive elements 16, 18, and 20 of FIG. 5.

FIG. 6 graphically represents the number of DAC steps (vertical axis) required to maintain equilibrium between capacitive elements 16, 18, and 20 of FIG. 5. Sensor 10 depicted in FIG. 5 functions substantially the same as sensor 10 as depicted in FIG. 1, the behavior of which is graphed in FIG. 4. However, separating the center capacitive element 18 into a pair of equally sized elements 18A and 18B, each having an area one half that of either element 16 or 20, moves the point at which the sum L+R is equal to zero. In one embodiment, the zero cross of line L+R is offset by a distance of approximately three-eighths of an inch. It has been found that this distance is consistent despite changes in capacitive variables such as humidity, wall thickness, or stud material. Hence, the offset is easily accounted for by adjusting the way the information of FIG. 6 is displayed. Moreover, the offset on either side of stud 12 results in a wider range over which the ratio (R–L)/(R+L) produces useful information. In one embodiment, each of elements 16, 18, and 20 have a length L of two inches, the width W of elements 16 and 20 is 0.5 inches, the distance $d_1$ between elements 18A and 18B is 0.5 inches, and the distance $d_2$ between elements 16 and 18A and between 20 and 18B is 0.01 inches.

Figure 7:
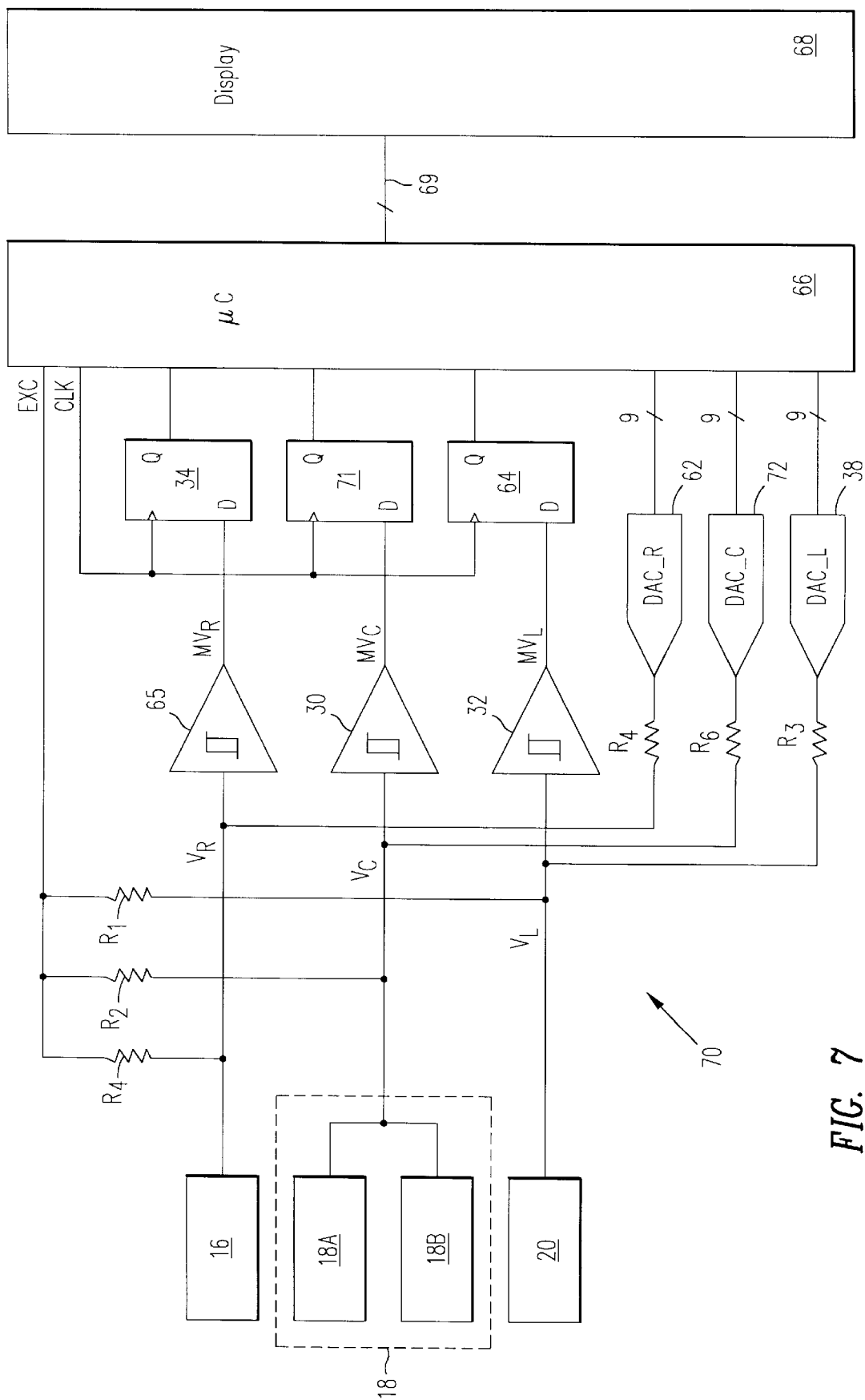
FIG. 7 is yet another embodiment of a sensor in accordance with the present invention.

FIG. 7 is yet another embodiment of a sensor in accordance with the present invention. Sensor 70 of FIG. 7 is similar to sensor 60 of FIG. 5, like-numbered elements being similar. However, to sensor 60 is added an additional flip-flop 71, an additional DAC 72, and an additional resistor R6 coupled between the output of DAC 72 and line $V_C$. In addition, microcontroller 66 is configured to output a clock signal on line $C_L$ K to drive the clock input terminals of each of flip-flops 34, 71, and 64.

In addition to removing line $MV_C$ from the clock input terminals of flip-flops 34 and 64, the line $MV_C$ is coupled instead to the D input of the additional flip-flop 71. As a consequence of the foregoing changes, capacitances $C_R$, $C_C$, and $C_L$ of capacitive elements 16, 18, and 20 are measured with respect to a common reference clock, as opposed to in prior embodiments where capacitances $C_R$ and $C_L$ of the right and left capacitive elements 16 and 20 were measured with respect to capacitance $C_C$ of center element 18.

Figure 8:
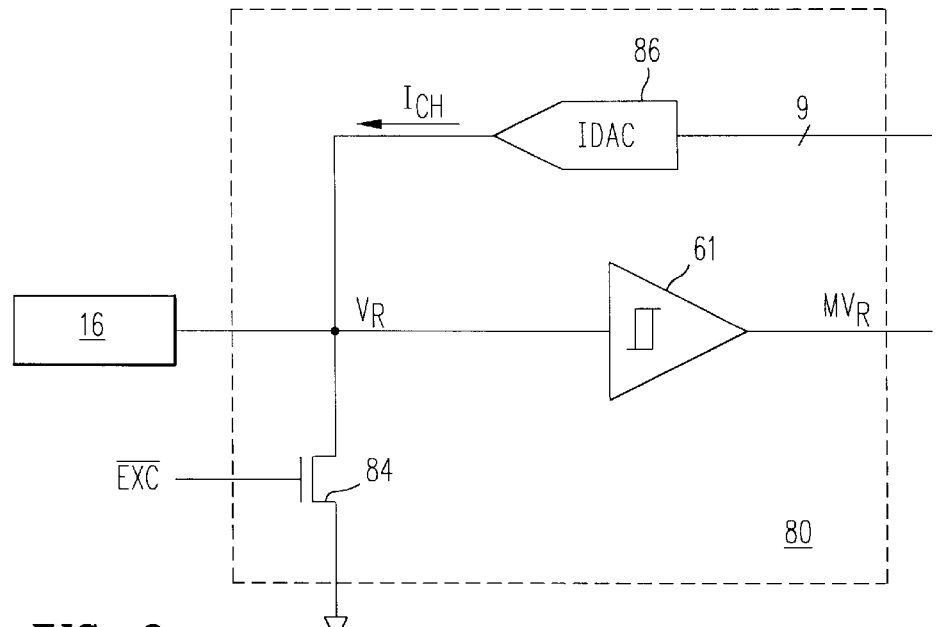
FIG. 8 is a schematic diagram of a circuit 80 for charging and discharging capacitive element 16.

FIG. 8 is a schematic diagram of a circuit 80 for charging and discharging right capacitive element 16; circuits similar to circuit 80 may be used to charge and discharge capacitive elements 18 and 20.

Circuit 80 includes a transistor 84 for discharging capacitive element 16. In place of DAC 62 of FIG. 5, circuit 80 includes a DAC 86 that provides a charging current $I_{CH}$ to line $V_R$. When the signal on line EXC is a logic one, the complement of the signal on line EXC ($\overline{EXC}$) turns transistor 84 is off to allow the charging current $I_{CH}$ to charge capacitive element 16. Then, when the signal on line EXC returns to a logic zero, the charge on capacitive element 16 is discharged to ground potential.

A sensor including circuit 80 functions substantially the same as sensor 60 of FIG. 5. However, the use of circuit 80 allows the function of sensor 60 to be provided without the need for resistors $R_1$, $R_2$, $R_3$, $R_4$, and $R_5$. This may be advantageous in some embodiments because transistor 84 is more easily integrated than are resistors $R_1$, $R_2$, $R_3$, $R_4$, and $R_5$. In addition, the rate of change of the voltage on capacitive element 16 (dV/dt) is a constant in circuit 80 as compared with the configuration of sensor 60. Maintaining the charge rate constant renders a sensor less sensitive to shifts in the switching threshold of the Schmitt triggers. Finally, the separate discharge path provided by transistor 84 speeds up the discharge rate of element 16, and consequently allows for substantial increases in the excitation duty cycle on line EXC.

Figure 9:
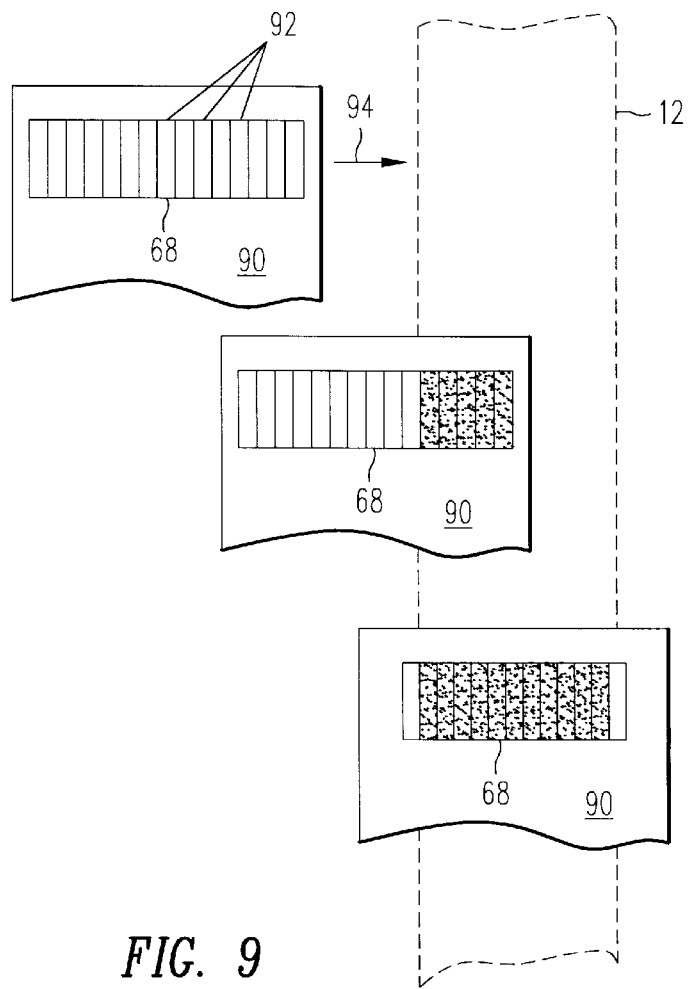
FIG. 9 depicts display 68 (of FIGS. 5 and 7) mounted within a housing 90.

FIG. 9 depicts display 68 (of FIGS. 5 and 7) mounted within a housing 90. In the embodiment of FIG. 9, display 68 is an LCD display that includes a number of binary (on/off) display elements 92. In the embodiment shown there are fifteen display elements 92; however, other numbers of elements may be used.

To illustrate the operation of display 68, housing 90 is depicted in three locations on a surface beneath which is located stud 12. As display 68 is moved to the right, as indicated by an arrow 94, those of display elements 92 positioned over stud 12 are illuminated, thus providing a "window" into the surface.

Display 68 is configured to provide 28 unique display patterns: all of elements 92 may be blank, from one to thirteen adjacent ones of the left-most thirteen elements may be illuminated, from one to thirteen adjacent ones of the right-most thirteen elements may be illuminated, or the center thirteen elements may be illuminated.

As housing 90 is moved right, those of elements 92 over stud 12 illuminate, in series, up to a maximum of 13 adjacent illuminated elements 92. Not illuminating the end ones of elements 92 when housing 90 is centered over stud 12 helps give the appearance of display 68 providing a "window into the wall." The manner of driving display 68 to achieve the window effect is described below in connection with FIGS. 10 through 12.

Display 90 may be any type of display, such as an LCD display, an LED display, or illuminated elements using other forms of illumination. In the context of the present application, "illuminated" refers to the presence of the displayed object (e.g., the segment being "on"); thus in the case of an LCD display as shown here, the "illuminated" portion may actually be darker (as shown in FIG. 9) than are the "non-illuminated" portions.

Figure 10:
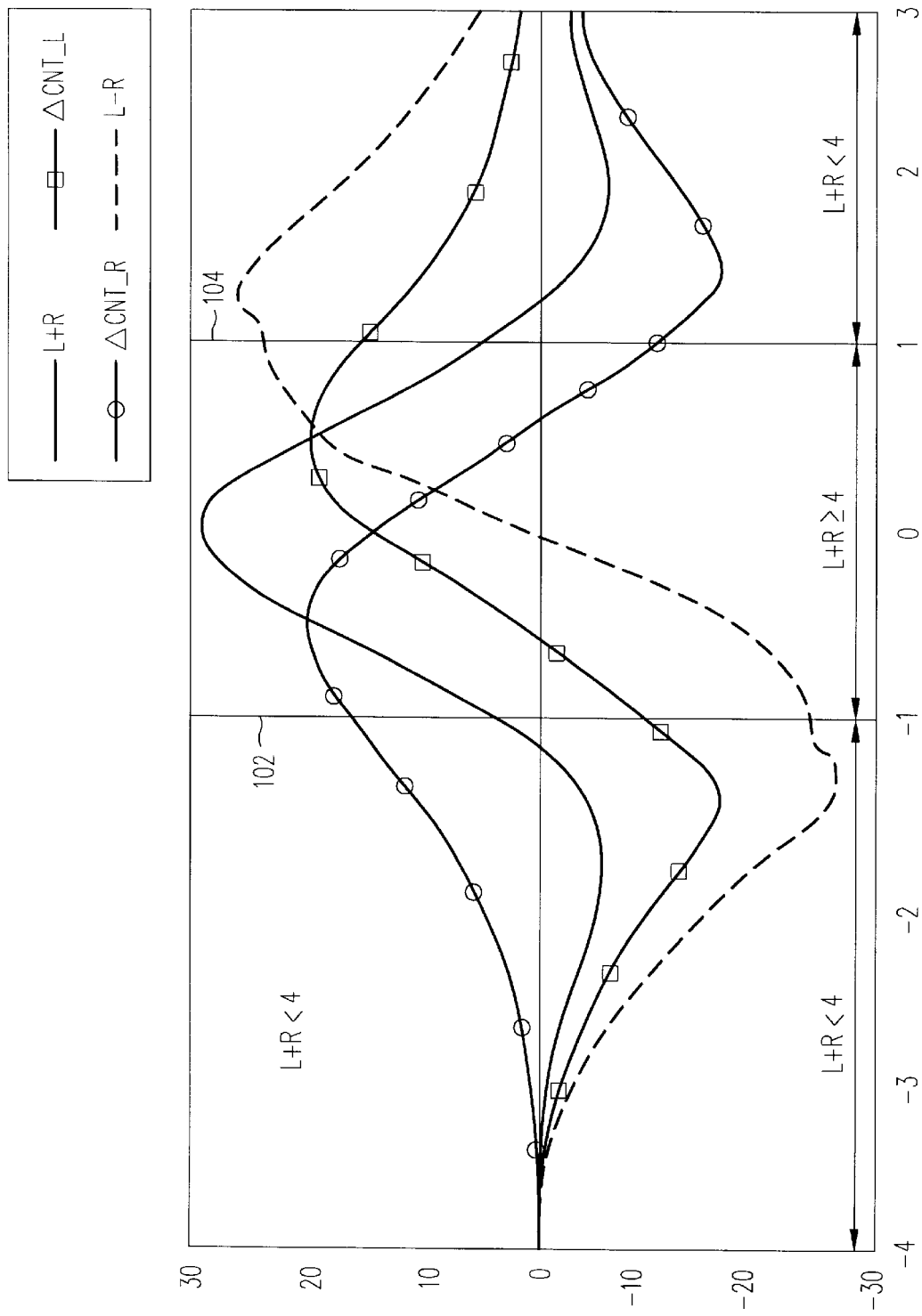
FIG. 10 graphically represents the number of DAC steps (vertical axis) required to maintain equilibrium between capacitive elements 16, 18, and 20 of FIG. 5.

FIG. 10 is similar to FIG. 6, and graphically represents the number of DAC steps (vertical axis) required to maintain equilibrium between capacitive elements 16, 18, and 20 of FIG. 5. In addition to the curves of FIG. 6, FIG. 10 includes a curve L–R that represents the difference between ΔCNT_R and ΔCNT_L. Vertical lines 102 and 104 indicate the points at which the sum L+R equals 4 DAC counts. In one embodiment, microcontroller 66 is programmed to drive display 68 using the signals L+R, ΔCNT_R, and ΔCNT_L.

Figure 11:
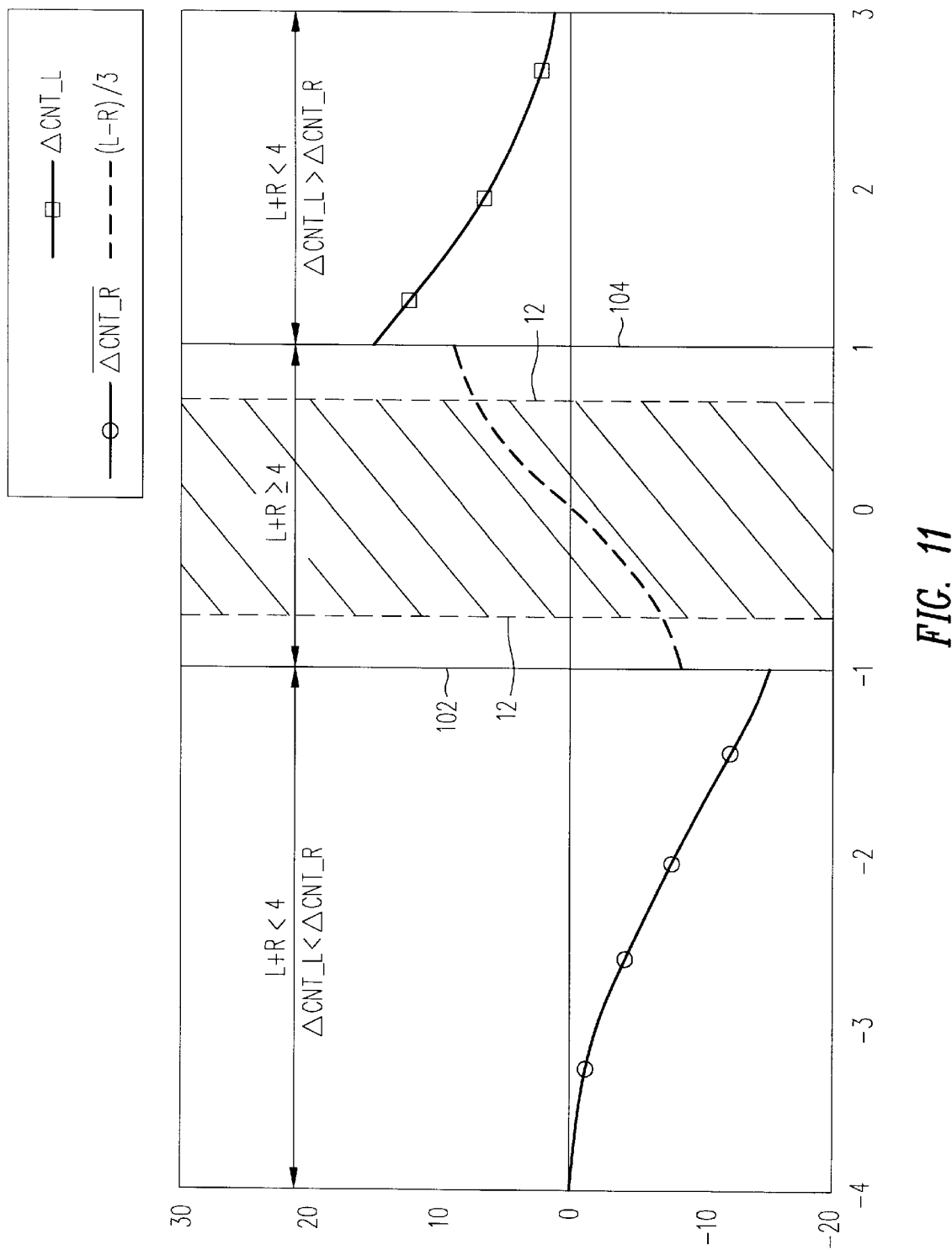
FIG. 11 graphically represents the data of FIG. 10 conditioned to provide input signals to display 68.

FIG. 11 is a graphical representation of the data of FIG. 10 conditioned to provide input signals to display 68. The area to the left of line 102 illustrates the complement of the signal of bus ΔCNT_R, $\overline{\Delta CNT\_R}$; the area between lines 102 and 104 illustrates one-third the difference between the signals of respective buses ΔCNT_R and ΔCNT_L; and the area to the right of line 104 illustrates the signal of bus ΔCNT_L.

Figure 12:
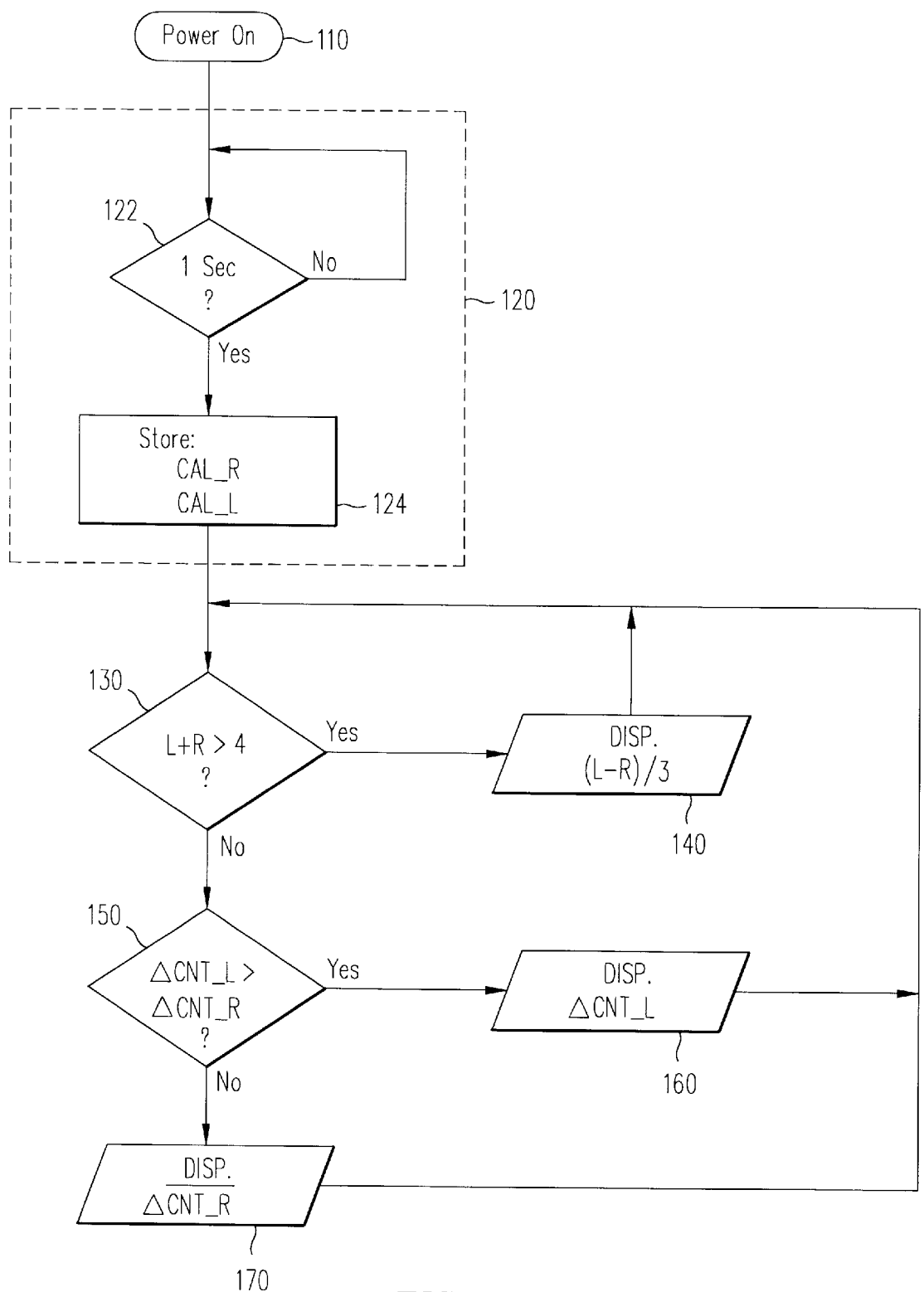
FIG. 12 is a flow chart illustrating the operation of microcontroller 66 in conjunction with the remaining circuitry of sensor 60.

FIG. 12 is a flow chart illustrating the operation of microcontroller 66 in conjunction with the remaining circuitry of sensor 60. When sensor 60 is powered up (step 110), microcontroller 66 automatically performs a calibration sequence (step 120). During the calibration sequence, an operator holds sensor 60 in a position such that dielectric constants $k_r$, $k_c$, and $k_l$ of the respective right, center, and left capacitive elements 16, 18, and 20 are equal for a calibration period. For example, sensor may be held away from any wall or structure so that an air dielectric is provided for each of capacitive elements 16, 18, or 20. In one embodiment, the calibration period is approximately one second.

During the calibration period, microcontroller 66 first sets each DAC 38,62 at half scale by writing the value 80 hex into each DAC 38,62. Next, microcontroller 66 cycles each DAC in a conventional successive-approximation routine starting with the most-significant bit. The nine-bit results for each DAC are then stored (step 124) as respective right and left calibration values CAL_R and CAL_L in registers within microcontroller 66.

Once sensor 60 is calibrated, the operator moves sensor 60 along a wall. Referring back to FIG. 11, as sensor 60 approaches stud 12, $\overline{\Delta CNT\_R}$ decreases. Microcontroller 66 monitors the value of L+R and, as long as L+R is less than four DAC counts (step 130) and ΔCNT_L<ΔCNT_R (step 150), provides a display corresponding to the value $\overline{\Delta CNT\_R}$. To select a unique display pattern, the value $\overline{\Delta CNT\_R}$ is converted to a signal driving display 68, wherein each DAC count selects a different one of the twenty-eight possible display patterns. For example, when the absolute value of $\overline{\Delta CNT\_R}$ is one DAC count, display 68 illuminates the right-most one of elements 92, and when the absolute value of $\overline{\Delta CNT\_R}$ is two, display 68 illuminates the right-most two of elements 92.

As sensor 60 is moved rightward, the value L+R eventually exceeds four DAC steps (see line 102 of FIG. 11). When L+R is greater than or equal to four DAC steps, microcontroller 66 used the value (L−R)/3 to select the appropriate display pattern. Finally, as sensor 60 is moved further to the right, the value of L+R will once again go below four DAC counts. This time, however, because ΔCNL_L is greater than ΔCNL_R, microcontroller 66 uses the value ΔCNL_L to select the appropriate display pattern (step 160).

The values ΔCNT_R, $\overline{\Delta CNT\_R}$, (L−R)/3, and ΔCNT_L are selected to control display 68 because they were empirically found to provide smooth transitions from one display pattern to the next as display 68 is passed over stud 12. Different sensors will require different treatment. It is to be understood that one of ordinary skill in the art could program microcontroller 66 to provide appropriate display signals to display 68 in response to the aforementioned output signals.

Although the present invention has been described in considerable detail with reference to certain preferred versions thereof, other versions are possible. For example, an embodiment similar to sensor 70 of FIG. 7 may be implemented without capacitive element 18 and the associated Schmitt trigger 30, flip-flop 71, DAC 72, and resistors $R_2$ and $R_6$. Therefore, the spirit and scope of the appended claims are not limited to the description of the preferred versions contained herein.

What is claimed is:

1. A method of locating an object positioned behind or within a volume of material, the method comprising:

positioning first, second, and third capacitive elements adjacent first, second, and third regions on a surface of the material wherein the second capacitive element is located between the first and third capacitive elements;

comparing a change of the relative capacitances of the first to that of the second capacitive element, and comparing a change of the relative capacitance of the second to that of the third capacitive element; and including moving the first, second, and third elements along the surface while comparing the relative capacitances of the first, second, and third capacitive elements.

2. The method of claim 1, wherein the relative capacitances are compared by comparing the relative voltage-change rates of the first, second, and third capacitive elements.

3. The method of claim 2, wherein comparing the relative voltage-change rates includes measuring first, second, and third charge times required for the first, second and third elements to charge to a threshold voltage.

4. The method of claim 1, further comprising a calibration that includes comparing the relative capacitances of the first, second, and third capacitive elements before positioning the first, second, and third capacitive elements adjacent first, second, and third regions on a surface of the material.

5. The method of claim 4, wherein the calibration includes positioning the first, second, and third capacitive elements adjacent a material having a single dielectric constant.

6. The method of claim 5, wherein the material is air.

7. The method of claim 1, further comprising simultaneously exciting the first, second, and third capacitive elements.

8. A device for locating an object positioned behind or within a volume of material, comprising:

first, second, and third capacitive elements arranged to be co-planar, the second capacitive element being located between the first and third capacitive elements;

a comparison circuit having first, second and third terminals coupled to respectively the first, second and third capacitive elements, wherein the comparison circuit compares a change of the capacitance of the first capacitive element to that of the second capacitive element, and compares a change of the capacitance of the second capacitive element to that of the third capacitive element by moving the first, second, and third elements along the surface while comparing the relative capacitances of the first, second, and third capacitive elements, thereby to determine a location of the object.

9. The device of claim 8, further comprising a single excitation source coupled to each of the first, second and third capacitive elements.

10. The device of claim 8, wherein the device determines a static location of the object.

11. The method of claim 1, wherein the first, second and third capacitive elements are arranged to be co-planar.

* * * * *